United States Patent [19]
Serur

[11] 3,929,157
[45] Dec. 30, 1975

[54] FLUID FLOW REGULATOR

[76] Inventor: Juan R. Serur, 34A Harvard Ave., Brookline, Mass. 02146

[22] Filed: June 17, 1974

[21] Appl. No.: 479,762

[52] U.S. Cl............................ 137/453; 128/214 C
[51] Int. Cl.²......................................... A61M 5/00
[58] Field of Search ............ 137/386, 397, 399, 453, 137/454, 571, 576; 128/214 R, 214 C, 214.2

[56] References Cited
UNITED STATES PATENTS

| 80,705 | 8/1868 | Boucher | 137/454 |
|---|---|---|---|
| 635,210 | 10/1899 | Van Vriesland | 137/453 |
| 2,374,076 | 4/1945 | Burckhardt et al. | 137/453 |
| 2,850,211 | 9/1958 | Fernandez | 128/214 R |
| 2,854,992 | 10/1958 | Hewitt | 128/214 R |
| 3,001,397 | 9/1961 | Leonard | 128/214 C |
| 3,093,267 | 6/1963 | Lowery | 137/454 X |
| 3,216,418 | 11/1965 | Scislowicz | 128/214 C |
| 3,216,419 | 11/1965 | Scislowicz | 128/214 C |
| 3,661,143 | 5/1972 | Henkin | 128/2 |
| 3,729,098 | 4/1973 | Serur | 210/321 |

Primary Examiner—Henry T. Klinksiek

[57] ABSTRACT

A rate of flow regulator for use in a gravity fed fluid delivery system, the regulator comprising first and second fluid chambers. The first chamber has a fluid inlet, a fluid outlet, and means for maintaining the fluid level in the chamber. The second chamber is disposed to receive fluid from that first chamber outlet and has its own fluid outlet. Vent means are also provided for establishing communication between each of the chambers and the exterior of the regulator.

10 Claims, 1 Drawing Figure

U.S. Patent  Dec. 30, 1975  3,929,157
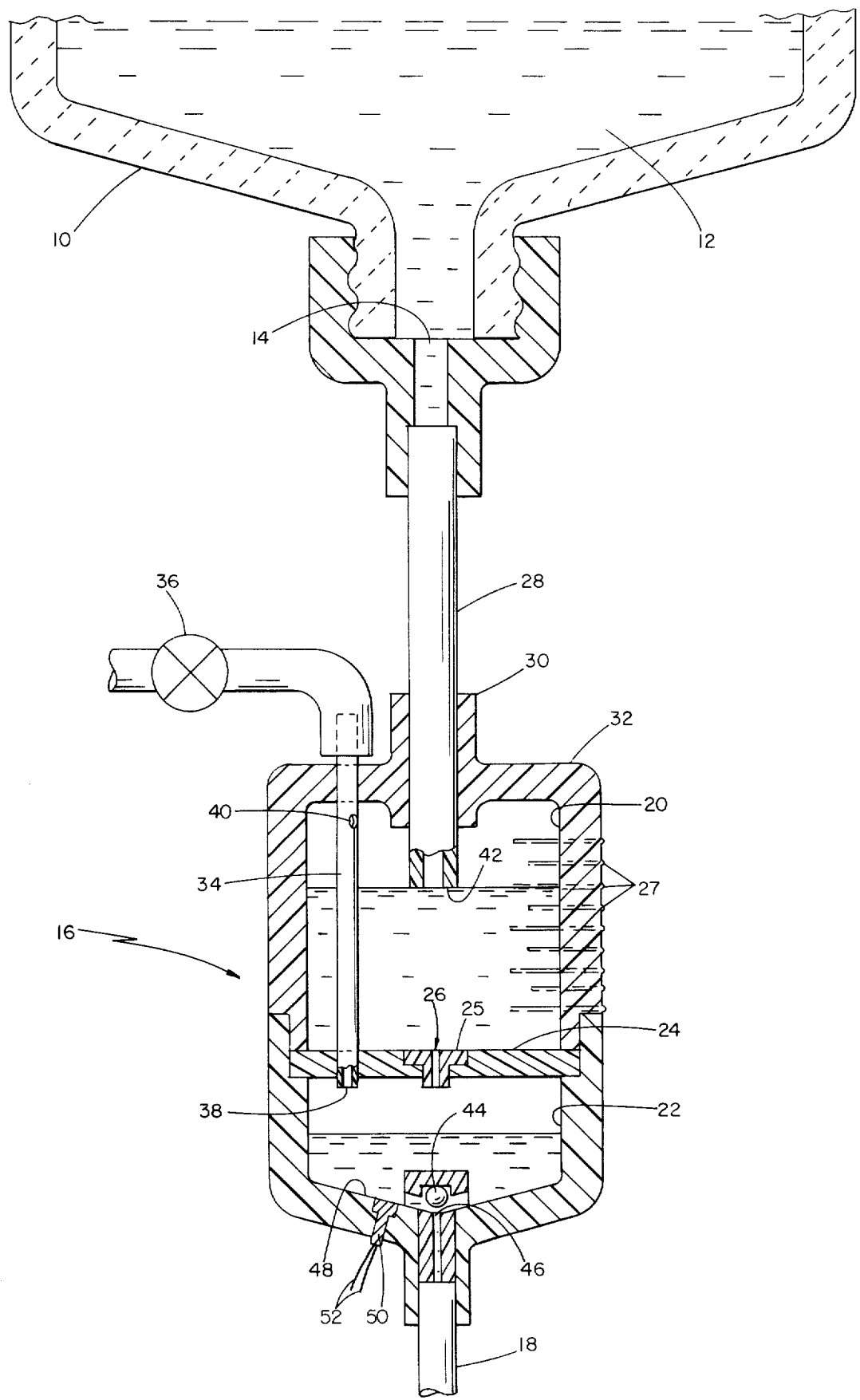

FLUID FLOW REGULATOR

This invention relates to a device for the control of fluid flow in a gravity fed fluid delivery system. While its utility is not limited thereto, a rate of flow regulator according to the present invention is particularly suitable for use in systems which deliver fluid in a medical application. A typical example of the use of such a rate of flow regulator is the supply of treatment fluid to a blood treatment device such as an artificial kidney. An example of a prior art flow regulator device is described in my prior U.S. Pat. No. 3,729,098, Treating Blood, issued Apr. 24, 1973.

It is a principle object of the present invention to provide an improved rate of flow regulator which is inexpensive to manufacture and simple to use and which incorporates certain desirable safety features which are especially valuable in medical use situations.

The invention features a rate of flow regulator for use in a gravity fed fluid delivery system comprising a first fluid chamber which has fluid inlet, a fluid outlet, and means for maintaining a fluid level in the chamber. A second fluid chamber is disposed to gravitationally receive fluid from the first chamber fluid outlet and has its own fluid outlet. Vent means are provided for establishing communication between each of the chambers and the exterior of the regulator.

In preferred embodiments of the invention automatically operable means are provided to detect the absence of fluid (or changes in the fluid's composition) in the second chamber and/or to block the second chamber outlet in such absence; those means for blocking the second chamber outlet comprise a float valve; the vent means include valve means for blocking that communication; the first and second chambers are contiguous, with the first chamber bottom wall also forming a second chamber top wall; and the vent means comprise a vent passage which extends through the first chamber from the top wall through the bottom wall. A first opening in the vent passage communicates with the second chamber and a second opening in the vent tube communicates with the first chamber.

Other objects, features, and advantages of the invention will appear from the following description of a particular preferred embodiment, taken together with the accompanying drawing which is a partially schematic illustration of a regulator constructed according to the present invention as used in a gravity fed fluid delivery system.

Referring to the drawing, a large container 10 for a fluid 12 has a relatively large opening 14 through which the fluid may be removed. Such a container is often provided in medical situations and may be provided with means for support (not shown) in an inverted configuration. The regulator according to the present invention is indicated generally at 16. In the situation illustrated, the purpose of the regulator 16 is to provide a uniform flow from the container 10 to a fluid tube 18 (e.g., a tube which communicates with the patient or with a piece of medical apparatus which in turn communicates with the patient) and at a rate which is much lower than that which would obtain if the fluid were to flow directly from the opening 14 to the tube 18. (Naturally, the regulator 16 is suitable for use with other forms of fluid supply than container 10.)

The regulator 16 includes an upper chamber 20 and a lower chamber 22 separated by a wall 24 having an opening 26 therein. As is indicated in the drawing, the chambers are preferably contiguous with the wall 24 forming a bottom wall for the chamber 20 and an upper wall for the chamber 22, the opening 26 providing a fluid outlet from the chamber 20 to the chamber 22. In one convenient embodiment, the chambers 20 and 22, as well as the entire unit 16, are formed from a transparent material (e.g., a plastic). Indicia 27 may be provided on the side wall of chamber 20 for purposes which are discussed below.

A fluid inlet tube 28 communicates with the opening 14 in the container 10 and extends downwardly into the chamber 20. Means 30 are provided in the upper wall 32 of the chamber 20 for supporting the tube 28 in a fashion so as to render its position with respect to the wall 24 adjustable. The means 30 may comprise an adaptor which is internally threaded, the tube 28 being externally threaded, or, as illustrated, may merely be a resilient friction fit in which the tube 28 can slide. Other alternative constructions are, of course, possible. A tube 34 contains a passage which provides communication from each of the chambers 20, 22 to the ambient atmosphere. A stop cock or valve 36 may be provided in an exterior segment of the tube 34. The open lower end 38 of tube 34 communicates with the chamber 22. Opening 40 in the tube 34 communicates with the chamber 20 at a location which is closer to the top wall 32 than is the end 42 of tube 28 within the chamber 20, thus assuring, as will be seen below, that the opening 40 is above the surface of fluid in the chamber 20. A valve 44 is provided at the mouth of a fluid outlet 46 from the second chamber bottom wall 48. In the illustrated embodiment, valve 44 is simply a float valve. The outlet 46 delivers fluid to the previously mentioned tube 18. Alternatively or additionally, a fluid sensor 50 of any conventional design may be provided to detect the absence of fluid in chamber 22 or other change in the fluid's condition (e.g., its physical or chemical characteristics such as an undesired change of saline-to-water ratio in a blood treatment fluid or its level in the chamber). The sensor 50 may be connected via leads 52 to any conventional alarm or blocking device (e.g., a solenoid valve in tube 18) to signal and/or initiate other action if the fluid in chamber 22 becomes exhausted. Naturally, the placement and operating principles of suitable sensors are variable.

In operation, the tube 28 is adjusted for height in the chamber 20, thereby adjusting the level to which fluid in the chamber 20 will accumulate. The fluid fills the chamber to this level while at the same time fluid is delivered from the first chamber 20 to the second chamber 22 at a slower rate by means of the fluid outlet 26, which is typically chosen to have a much smaller cross-sectional area than that of tube 28. The height of the column of fluid within the device 16 is defined by a position of the end 42 of tube 28. This height, of course, determines the hydrostatic pressure which forces fluid through the restricted opening 26, and thus the flow rate through that opening. The indicia 27 may be calibrated to indicate the flow rate for a given fluid level within the chamber 20 and a given size of outlet opening 26. The opening 26 may be provided in a removable plug 25 whereby the opening size may be varied by a suitable change in plugs 25. The valve 44 prevents air from entering the tube 18 should the supply of fluid become exhausted. This, of course, provides a significant safety feature for uses in which the tube 18 is connected directly to the patient. Furthermore, the closing of the stop cock or valve 36 will stop all flow of fluid within the device, the pressure above the fluid in each chamber decreasing if the fluid level lowers. Thus the tube 34 and valve 36 provide a simple and convenient control to terminate delivery of fluid to tube 18 while maintaining the readiness of the device 16 to immediately resume such delivery when desired. Even absent valve 36, the tube 34 would terminate flow if a blockage should occur, for example, in tube 18. As the chamber 22 filled with fluid, the excess would be forced upward through opening 38 and into tube 34. When the level in tube 34 reached the fluid level in chamber 20, all flow would cease. The venting of both chambers also serves to regulate the fluid flow since atmospheric pressure will be over the fluid in each chamber. (Absent a vent for chamber 22, for example, the rate of fluid delivery to tube 18 would depend upon the balance between the pressure in chamber 20 and the, typically variable, pressure in the unit to which tube 18 leads.)

While a particular preferred embodiment of the invention has been illustrated in the accompanying drawing and described in detail herein, other embodiments are within the scope of the invention and the following claims.

What is claimed is:

1. A rate of flow regulator for use in a gravity assisted fluid delivery system, the regulator comprising
    a first upper fluid chamber having a fluid inlet, fluid outlet means, and means for maintaining a predetermined level of fluid in said upper chamber;
    a second lower fluid chamber having an inlet lower than said outlet means and disposed to gravitationally receive all fluid from said upper fluid chamber outlet means and having a fluid outlet; and
    vent means for establishing uninterrupted communication between each said chamber and the atmosphere exterior of the regulator.

2. The regulator of claim 1 further comprising automatically operating means to detect a changed fluid condition in the second chamber.

3. The regulator of claim 1 further comprising automatically operating means for blocking the second chamber fluid outlet when fluid in the second chamber is exhausted.

4. The regulator of claim 3 wherein said automatically operating means comprise a float valve.

5. The regulator of claim 1 wherein said chambers are contiguous, said first chamber having a bottom wall which also forms a second chamber top wall.

6. The regulator of claim 5 wherein said vent means comprise an air passage extending through said first chamber from said top wall to said bottom wall, a first opening in said passage communicating with said second chamber and a second opening in said passage communicating with said first chamber.

7. The regulator of claim 6 wherein said vent means further comprise valve means for blocking said communication between each said chamber and the exterior of the regulator.

8. The regulator of claim 1 wherein said first fluid chamber includes a transparent side wall having indicia thereon, said indicia providing a measure of the flow of fluid through the regulator.

9. The regulator of claim 1 wherein said means for maintaining a predetermined level are adjustable whereby any of a plurality of predetermined levels may be maintained.

10. A rate of flow regulator for use in a gravity fed fluid delivery system, the regulator comprising
    a first upper fluid chamber having a fluid inlet, fluid outlet means, and adjustable means for maintaining any of a plurality of predetermined levels of fluid in said first chamber;
    a second lower chamber fixed with respect to said first chamber and having an inlet which is lower than said outlet means and which is disposed to gravitationally receive all fluid from said outlet means and having a bottom wall with a fluid outlet therein, said fluid outlet including a float valve, whereby said outlet is blocked when fluid in said second chamber is exhausted; and
    vent means for establishing uninterrupted communication between each said chamber and the atmosphere exterior of the regulator and including valve means for blocking said communication.

* * * * *